United States Patent
Zhao et al.

(10) Patent No.: US 11,284,430 B2
(45) Date of Patent: Mar. 22, 2022

(54) METHOD OF DETERMINING AMBIGUOUS PERIOD, TERMINAL AND NETWORK-SIDE DEVICE

(71) Applicant: DATANG MOBILE COMMUNICATIONS EQUIPMENT CO., LTD., Beijing (CN)

(72) Inventors: Yali Zhao, Beijing (CN); Pierre Bertrand, Beijing (CN); Li Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/054,110

(22) PCT Filed: Apr. 26, 2019

(86) PCT No.: PCT/CN2019/084507
§ 371 (c)(1),
(2) Date: Nov. 9, 2020

(87) PCT Pub. No.: WO2019/214460
PCT Pub. Date: Nov. 14, 2019

(65) Prior Publication Data
US 2021/0250976 A1    Aug. 12, 2021

(30) Foreign Application Priority Data
May 9, 2018 (CN) .......................... 201810464472.0

(51) Int. Cl.
*H04W 72/02*    (2009.01)
*H04W 76/27*    (2018.01)
(Continued)

(52) U.S. Cl.
CPC ...... *H04W 72/1289* (2013.01); *H04B 7/0626* (2013.01); *H04W 72/0446* (2013.01);
(Continued)

(58) Field of Classification Search
None
See application file for complete search history.

(56) References Cited

U.S. PATENT DOCUMENTS

| | | | |
|---|---|---|---|
| 2013/0028192 A1 | 1/2013 | Cheng et al. | |
| 2014/0029486 A1 | 1/2014 | Li et al. | |

(Continued)

FOREIGN PATENT DOCUMENTS

| | | |
|---|---|---|
| CN | 102215085 | 10/2011 |
| CN | 102469506 | 5/2012 |

(Continued)

OTHER PUBLICATIONS

MediaTek Inc. (R2-1803061,3GPP TSG-RAN Meeting #101, Athens, Greece, Feb. 26-Mar. 2, 2018. (Year: 2018).*

(Continued)

*Primary Examiner* — Faruk Hamza
*Assistant Examiner* — Cassandra L Decker
(74) *Attorney, Agent, or Firm* — Ladas & Parry, LLP

(57) ABSTRACT

A method of determining an ambiguous period, a terminal and a network-side device are provided. The method includes: determining, by a terminal, the ambiguous period, where the ambiguous period corresponds to a processing time for a PDCCH, or the ambiguous period corresponds to a processing time for an MAC CE; and determining by the terminal, according to a control message which is received, whether to send an uplink signal at a current time, where a difference between a receiving time of the control message and the current time is greater than or equal to the ambiguous period.

14 Claims, 5 Drawing Sheets

(51) Int. Cl.
    *H04B 7/06*     (2006.01)
    *H04W 72/04*     (2009.01)
    *H04W 80/02*     (2009.01)
    *H04W 52/02*     (2009.01)
    *H04L 5/00*     (2006.01)
    *H04W 76/28*     (2018.01)
    *H04W 72/12*     (2009.01)

(52) U.S. Cl.
    CPC ... *H04W 72/1226* (2013.01); *H04W 72/1257* (2013.01); *H04W 76/27* (2018.02); *H04W 80/02* (2013.01)

(56) References Cited

U.S. PATENT DOCUMENTS

| | | | |
|---|---|---|---|
| 2018/0110084 A1 | 4/2018 | Dinan et al. | |
| 2019/0104543 A1* | 4/2019 | Park | H04W 72/0453 |
| 2019/0199412 A1* | 6/2019 | Koskela | H04W 72/0446 |
| 2021/0022080 A1* | 1/2021 | Chang | H04W 52/0216 |
| 2021/0058197 A1* | 2/2021 | Gao | H04W 72/14 |

FOREIGN PATENT DOCUMENTS

| | | |
|---|---|---|
| CN | 102740477 A | 10/2012 |
| CN | 104080179 | 10/2014 |
| CN | 105722195 A | 6/2016 |

OTHER PUBLICATIONS

International Search Report issued for International Application No. PCT/CN2019/84507 dated Aug. 1, 2019 and English translation provided by WIPO.

Written Opinion issued for International Application No. PCT/CN2019/84507 dated Aug. 1, 2019 and English translation provided by WIPO.

International Preliminary Report on Patentability issued for International Application No. PCT/CN2019/84507 dated Nov. 10, 2020 and English translation provided by WIPO.

Office Action issued for Chinese Application No. 201810464472.0 dated Sep. 16, 2020 and English translation.

Huawei, HiSilicon, 3GPPTSG WG2 Meeting 101bis, R2-1805572, DRX ambiguous period, Apr. 2018, entire document.

Catt, 3GPP TSG-RAN WG2#101b, R2-1804486, Value of DRX Ambiguous Period, Apr. 2018, entire document.

Huawei, HiSilicon, 3GPP TSG-RAN2 Meeting #101 bis, R2-1806232, Introduction of DRX ambiguous period, Apr. 2018, entire document.

Notice of Reason for Refusal from JP app. No. 2020-562641, dated Feb. 1, 2022, with English translation from Global Dossier, all pages.

Intel Corporation, "C-DRX enhancement in NR", R2-1708791, Revision of R2-1707026, 3GPP TSG RAN WG2 Meeting #99, Berlin, Germany, Aug. 21-25, 2017, all pages.

OPPO, "CSI and SRS reporting for DRX Active time", R2-1804431, 3GPP TSG-RAN2 #101 bis, Sanya, China, Apr. 16-20, 2018, all pages.

* cited by examiner

METHOD OF DETERMINING AMBIGUOUS PERIOD, TERMINAL AND NETWORK-SIDE DEVICE

CROSS REFERENCE OF RELATED APPLICATIONS

The present application is the U.S. national phase of PCT Application No. PCT/CN2019/084507 filed on Apr. 26, 2019, which claims a priority of Chinese patent application No. 201810464472.0 filed on May 9, 2018, the disclosures of which are incorporated herein by reference in their entireties.

TECHNICAL FIELD

The present disclosure relates to the field of communications technologies, and in particular, to a method of determining an ambiguous period, a terminal and a network-side device.

BACKGROUND

To support the terminal to save power, the wireless communication system introduces a Discontinuous Reception (DRX) mechanism, in which the terminal does not continuously monitor the control channel, but monitors the control channel for a part of time, where the time for monitoring the control channel may be referred to as an Active Time. In practical applications, when the terminal employs the DRX mechanism, a plurality of timers may be started, for example: an On duration Timer, an Uplink discontinuous reception Retransmission Timer (UL drx-Retransmission Timer), a Downlink discontinuous reception Retransmission Timer (DL drx-Retransmission Timer), and a discontinuous reception Inactivity Timer (drx-Inactivity Timer), where when any one of the timers is running, the terminal monitors a control channel. However, in a New Radio (NR) system, a network-side device and a terminal have a problem of an ambiguous period for an Active Time of the terminal, where the ambiguous period is a duration in which the network-side device and the terminal do not understand consistently whether the terminal is in the Active Time at the present, so that the network-side device cannot determine whether the terminal will send Channel State Information (CSI), a Sounding Reference Signal (or may be referred to as a pilot Signal, SRS), and a CSI and a HARQ Acknowledgement (ACK)/Negative Acknowledgement (NACK) transmission mode that the terminal uses in a case that the terminal has CSI and HARQ Acknowledgement (ACK)/NACK transmission mode at the same Time. Therefore, the network-side device may perform a blind detection on whether the terminal CSI/SRS is transmitted and perform a blind detection on whether the CSI and the HARQ ACK/NACK are multiplexed, so the communication performance of the wireless communication system is relatively poor.

SUMMARY

A method of determining an ambiguous period, a terminal and a network-side device are provided in the embodiments of the present disclosure, which solve the problem of poor communication performance of a wireless communication system.

A method of determining an ambiguous period is in an embodiment of the present disclosure, including:

determining, by a terminal, the ambiguous period, where the ambiguous period corresponds to a processing time for a Physical Downlink Control Channel (PDCCH), or the ambiguous period corresponds to a processing time for a Media Access Control Control Element (MAC CE); and determining by the terminal, according to a control message which is received, whether to send an uplink signal at a current time, where a difference between a receiving time of the control message and the current time is greater than or equal to the ambiguous period.

Optionally, the determining by the terminal the ambiguous period includes:

determining the ambiguous period by the terminal, according to at least one of a content carried by the PDCCH and a Channel State Information (CSI) masking configuration.

Optionally, the determining the ambiguous period by the terminal according to at least one of the content carried by the PDCCH and the CSI masking configuration includes:

in a case that the terminal is not configured with the CSI masking and the content carried by the PDCCH is an uplink (UL) grant, determining by the terminal that the ambiguous period is equal to the processing time for the PDCCH; or in the case that the terminal is not configured with the CSI masking and the content carried by the PDCCH is a downlink (DL) assignment, determining by the terminal that the ambiguous period is equal to a sum of a K0, a K1 and the processing time for the MAC CE; or in a case that the terminal is configured with the CSI masking, determining by the terminal that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining by the terminal the ambiguous period includes:

determining by the terminal that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining by the terminal, according to the control message which is received, whether to send the uplink signal at the current time includes:

determining by the terminal, according to the control message which is received, whether the current time is an Active Time, and not sending the SRS by the terminal in a case that the current time is not the Active Time; or in a case that the terminal is configured with a CSI masking, determining by the terminal, according to the control message which is received, whether an on duration timer is running at the current time, and not sending the CSI by the terminal in a case that the on duration timer is not running; or in a case that the terminal is not configured with the CSI masking, determining by the terminal, according to the control message which is received, whether the current time is the Active Time, and not sending the CSI by the terminal in the case that the current time is not the Active Time.

A method of determining an ambiguous period is further provided in an embodiment of the present disclosure, including:

determining, by a network-side device, the ambiguous period, where the ambiguous period corresponds to a processing time for a Physical Downlink Control Channel (PDCCH), or the ambiguous period corresponds to a processing time for a Media Access Control Control Element (MAC CE); and determining by the network-side device, according to a control message sent to a terminal, whether the terminal sends an uplink signal at a current time, where a difference between a receiving time of the control message and the current time is greater than or equal to the ambiguous period.

Optionally, the determining by the network-side device the ambiguous period includes:

determining the ambiguous period by the network-side device, according to at least one of a content carried by the PDCCH and a Channel State Information (CSI) masking configuration.

Optionally, the determining the ambiguous period by the network-side device according to at least one of the content carried by the PDCCH and the CSI masking configuration includes:

in a case that the terminal is not configured with the CSI masking and the content carried by the PDCCH is an uplink (UL) grant, determining by the network-side device that the ambiguous period is equal to the processing time for the PDCCH; or in the case that the terminal is not configured with the CSI masking and the content carried by the PDCCH is a downlink (DL) assignment, determining by the network-side device that the ambiguous period is equal to a sum of a K0, a K1 and the processing time for the MAC CE; or in a case that the terminal is configured with the CSI masking, determining by the network-side device that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining by the network-side device the ambiguous period includes:

determining by the network-side device that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining by the network-side device, according to the control message sent to the terminal, whether the terminal sends the uplink signal at the current time includes:

determining by the network-side device, according to the control message sent to the terminal, whether the current time is an Active Time, and determining, by the network-side device, that the terminal does not send the SRS, in a case that the current time is not the Active Time; or in a case that the terminal is configured with a CSI masking, determining by the network-side device, according to the control message sent to the terminal, whether an on duration timer is running at the current time, and determining, by the network-side device, that the terminal does not send the CSI, in a case that the on duration timer is not running; or in a case that the terminal is not configured with the CSI masking, determining by the network-side device, according to the control message sent to the terminal, whether the current time is the Active Time, and determining, by the network-side device, that the terminal does not send the CSI, in the case that the current time is not the Active Time.

A terminal is further in an embodiment of the present disclosure, including:

a first determining module, configured to determine an ambiguous period, where the ambiguous period corresponds to a processing time for a Physical Downlink Control Channel (PDCCH), or the ambiguous period corresponds to a processing time for a Media Access Control Control Element (MAC CE); and a second determining module, configured to determine, according to a control message which is received, whether to send an uplink signal at a current time, where a difference between a receiving time of the control message and the current time is greater than or equal to the ambiguous period.

Optionally, the first determining module is configured to determine the ambiguous period according to at least one of a content carried by the PDCCH and a Channel State Information (CSI) masking configuration.

Optionally, the first determining module is configured to:

in a case that the terminal is not configured with the CSI masking and the content carried by the PDCCH is an uplink (UL) grant, determine that the ambiguous period is equal to the processing time for the PDCCH; or in the case that the terminal is not configured with the CSI masking and the content carried by the PDCCH is a downlink (DL) assignment, determine that the ambiguous period is equal to a sum of a K0, a K1 and the processing time for the MAC CE; or in a case that the terminal is configured with the CSI masking, determine that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

A network-side device is further in an embodiment of the present disclosure, including:

a first determining module, configured to determine an ambiguous period, where the ambiguous period corresponds to a processing time for a Physical Downlink Control Channel (PDCCH), or the ambiguous period corresponds to a processing time for a Media Access Control Control Element (MAC CE); and a second determining module, configured to determine, according to a control message sent to a terminal, whether the terminal sends an uplink signal at a current time, where a difference between a receiving time of the control message and the current time is greater than or equal to the ambiguous period.

Optionally, the first determining module is configured to determine the ambiguous period according to at least one of a content carried by the PDCCH and a Channel State Information (CSI) masking configuration.

Optionally, the first determining module is configured to:

in a case that the terminal is not configured with the CSI masking and the content carried by the PDCCH is an uplink (UL) grant, determine that the ambiguous period is equal to the processing time for the PDCCH; or in the case that the terminal is not configured with the CSI masking and the content carried by the PDCCH is a downlink (DL) assignment, determine that the ambiguous period is equal to a sum of a K0, a K1 and the processing time for the MAC CE; or in a case that the terminal is configured with the CSI masking, determine that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

A terminal is further in an embodiment of the present disclosure, including: a transceiver, a memory, a processor and a program stored in the memory and executable on the processor, where the processor is configured to read the program in the memory to perform:

determining an ambiguous period, where the ambiguous period corresponds to a processing time for a Physical Downlink Control Channel (PDCCH), or the ambiguous period corresponds to a processing time for a Media Access Control Control Element (MAC CE); and determining, according to a control message which is received, whether to send an uplink signal at a current time, where a difference between a receiving time of the control message and the current time is greater than or equal to the ambiguous period;

or, the transceiver is controlled by the processor to:

determining an ambiguous period, where the ambiguous period corresponds to a processing time for a PDCCH, or the ambiguous period corresponds to a processing time for an MAC CE; and determining, according to a control message which is received, whether to send an uplink signal at a current time, where a difference between a receiving time of the control message and the current time is greater than or equal to the ambiguous period.

Optionally, the determining the ambiguous period includes:

determining the ambiguous period, according to at least one of a content carried by the PDCCH and a Channel State Information (CSI) masking configuration.

Optionally, the determining the ambiguous period according to at least one of the content carried by the PDCCH and the CSI masking configuration includes:

in a case that the terminal is not configured with the CSI masking and the content carried by the PDCCH is an uplink (UL) grant, determining that the ambiguous period is equal to the processing time for the PDCCH; or in the case that the terminal is not configured with the CSI masking and the content carried by the PDCCH is a downlink (DL) assignment, determining that the ambiguous period is equal to a sum of a K0, a K1 and the processing time for the MAC CE; or in a case that the terminal is configured with the CSI masking, determining that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining the ambiguous period includes:

determining that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining, according to the control message which is received, whether to send the uplink signal at the current time includes:

determining, according to the control message which is received, whether the current time is an Active Time, and not sending the SRS in a case that the current time is not the Active Time; or in a case that the terminal is configured with a CSI masking, determining, according to the control message which is received, whether an on duration timer is running at the current time, and not sending the CSI in a case that the on duration timer is not running; or in a case that the terminal is not configured with the CSI masking, determining, according to the control message which is received, whether the current time is the Active Time, and not sending the CSI in the case that the current time is not the Active Time.

A network-side device is further in an embodiment of the present disclosure, including: a transceiver, a memory, a processor and a program stored in the memory and executable on the processor, where the processor is configured to read the program in the memory to perform:

determining an ambiguous period, where the ambiguous period corresponds to a processing time for a Physical Downlink Control Channel (PDCCH), or the ambiguous period corresponds to a processing time for a Media Access Control Control Element (MAC CE); and determining, according to a control message sent to a terminal, whether the terminal sends an uplink signal at a current time, where a difference between a receiving time of the control message and the current time is greater than or equal to the ambiguous period;

or, the transceiver is controlled by the processor to:

determining an ambiguous period, where the ambiguous period corresponds to a processing time for a Physical Downlink Control Channel (PDCCH), or the ambiguous period corresponds to a processing time for a Media Access Control Control Element (MAC CE); and determining, according to a control message sent to a terminal, whether the terminal sends an uplink signal at a current time, where a difference between a receiving time of the control message and the current time is greater than or equal to the ambiguous period.

Optionally, the determining the ambiguous period includes:

determining the ambiguous period, according to at least one of a content carried by the PDCCH and a Channel State Information (CSI) masking configuration.

Optionally, the determining the ambiguous period according to at least one of the content carried by the PDCCH and the CSI masking configuration includes:

in a case that the terminal is not configured with the CSI masking and the content carried by the PDCCH is an uplink (UL) grant, determining that the ambiguous period is equal to the processing time for the PDCCH; or in the case that the terminal is not configured with the CSI masking and the content carried by the PDCCH is a downlink (DL) assignment, determining that the ambiguous period is equal to a sum of a K0, a K1 and the processing time for the MAC CE; or in a case that the terminal is configured with the CSI masking, determining that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining the ambiguous period includes:

determining that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining, according to the control message sent to the terminal, whether the terminal sends the uplink signal at the current time includes:

determining, according to the control message sent to the terminal, whether the current time is an Active Time, and determining that the terminal does not send the SRS, in a case that the current time is not the Active Time; or in a case that the terminal is configured with a CSI masking, determining, according to the control message sent to the terminal, whether an on duration timer is running at the current time, and determining that the terminal does not send the CSI, in a case that the on duration timer is not running; or in a case that the terminal is not configured with the CSI masking, determining, according to the control message sent to the terminal, whether the current time is the Active Time, and determining that the terminal does not send the CSI, in the case that the current time is not the Active Time.

A computer-readable storage medium is further in an embodiment of the present disclosure, where a computer program is stored in the computer-readable storage medium, where the program is executed by a processor to perform the method of determining the ambiguous period at the terminal side, or the program is executed by the processor to perform the method of determining the ambiguous period at the network-side device side.

In the embodiment of the disclosure, a terminal determines an ambiguous period, where the ambiguous period corresponds to a processing time for a Physical Downlink Control Channel (PDCCH), or the ambiguous period corresponds to a processing time for a Media Access Control Control Unit (MAC CE); and the terminal determines whether uplink signal transmission is carried out at the current time according to the control message which is received, where the difference between the receiving time of the control message and the current time is greater than or equal to the ambiguous period. Therefore, whether the uplink message is sent may be determined according to the ambiguous period, so that transmission errors between the network-side device and the terminal are reduced, the communication performance of the wireless communication system is improved, and the unnecessary blind detection of the network-side device may be avoided.

DETAILED DESCRIPTION

To make the technical problems, technical solutions and advantages to be solved by the present disclosure clearer, the following detailed description is made with reference to the drawings and embodiments.

Figure 1:
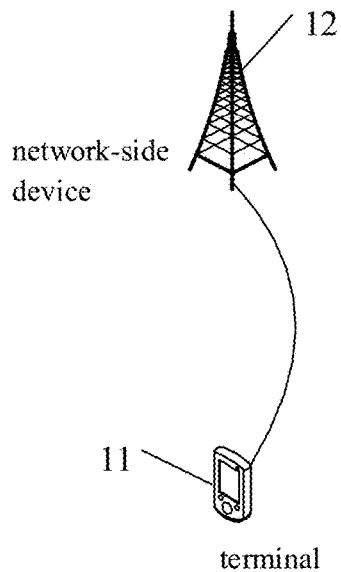
FIG. 1 is a schematic view of a network structure applicable to the embodiments of the present disclosure.

Referring to FIG. 1 which is a schematic view of a network structure applicable to the embodiments of the present disclosure, and as shown in FIG. 1, the network structure includes a terminal 11 and a network-side device 12, where the terminal 11 may be a User Equipment (UE) or other terminal devices, for example: terminal side devices such as a Mobile phone, a Tablet Personal Computer (Tablet Personal Computer), a Laptop Computer (Laptop Computer), a Personal Digital Assistant (PDA), a Mobile Internet Device (MID), or a Wearable Device (Wearable Device) are not limited to specific types of terminals in the embodiments of the present disclosure. The network-side device 12 may be a base station, for example: macro station, LTE eNB, 5G NR NB, and the like; the network-side device may also be a small station, such as a Low Power Node (LPN), pico, femto, or the network-side device may be an Access Point (AP); the base station may also be a network node composed of a Central Unit (CU) and a plurality of Transmission Reception Points (TRPs) whose management is and controls. It should be noted that, in the embodiment of the present disclosure, the specific type of the network-side device is not limited.

Figure 2:
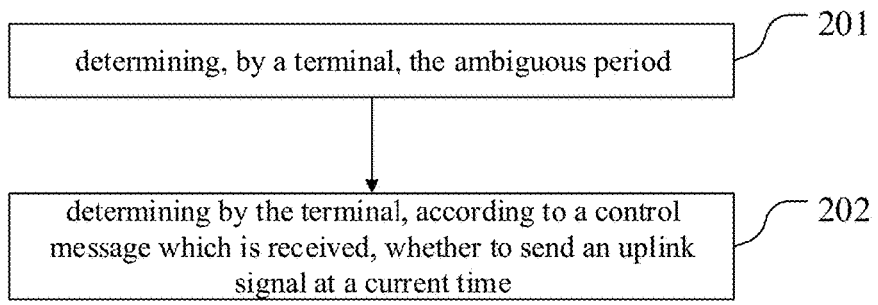
FIG. 2 is a flowchart of a method of determining an ambiguous period in an embodiment of the present disclosure.

Referring to FIG. 2 which is a flowchart of a method of determining an ambiguous period in an embodiment of the present disclosure, as shown in FIG. 2, the method includes the following steps:

201: determining, by a terminal, the ambiguous period, where the ambiguous period corresponds to a processing time for a PDCCH, or the ambiguous period corresponds to a processing time for an MAC CE;

202: determining by the terminal, according to a control message which is received, whether to send an uplink signal at a current time, where a difference between a receiving time of the control message and the current time is greater than or equal to the ambiguous period.

In the embodiment of the present disclosure, the ambiguous period may refer to a duration during in the network-side device and the terminal understand inconsistently whether the terminal is currently in Active Time.

The processing time for PDCCH may be the time required for the terminal to process the PDCCH, for example: the processing time for PDCCH includes a parsing time of the PDCCH. Of course, the processing time for PDCCH may be configured in advance by the terminal, or defined in the protocol, or configured by the network-side device for the terminal in advance, and the like, which is not limited herein.

The correspondence between the ambiguous period and the processing time for the PDCCH may be understood as that there is a certain relationship between the ambiguous period and the processing time for the PDCCH, for example: in some embodiments, the ambiguous period is equal to the processing time for the PDCCH, thereby avoiding the inconsistent understanding of the network-side device and the terminal for the Active Time of the terminal due to the processing time for the PDCCH, avoiding the unnecessary blind detection of the network-side device, and the improving the communication performance of the wireless communication system.

The processing time for the MAC CE may be a time taken for the terminal to process the MAC CE, for example: the processing time for the MAC CE includes a parsing time of the MAC CE. It should be noted that, in the embodiment of the present disclosure, the processing time for the MAC CE may be a fixed value, for example: 0.5 ms or 0 ms, and specifically, in a case that the terminal is able to complete the analysis of the MAC CE within the time interval between the PDSCH and the HARQ feedback corresponding thereto, it may be determined that the processing time for the MAC CE is 0 ms, because the terminal does not need to occupy additional time for processing the MAC CE in this case.

The correspondence between the ambiguous period and the processing time for the MAC CE can be understood as that there is a correspondence between the ambiguous period and the processing time for the MAC CE, for example: the ambiguous period is equal to the sum of the processing time for the MAC CE and a fixed value, or the ambiguous period is equal to the sum of K0, K1 and the processing time for the MAC CE, where K0 is the time interval between a PDCCH and a PDSCH scheduled by the PDCCH, and K1 is the time interval between the PDSCH and a HARQ feedback corresponding thereto. Because the ambiguous period corresponds to the processing time for the MAC CE, thereby avoiding the inconsistent understanding of the network-side device and the terminal for the Active Time of the terminal, avoiding the unnecessary blind detection of the network-side device, and the improving the communication performance of the wireless communication system.

In addition, the terminal determining whether to send the uplink signal transmission at the current time according to the control message which is received by the terminal may include: at a time N, determining whether to send the uplink signal transmission according to the control message received before subtracting the ambiguous period from the time N, where the time N is the current time and may also be understood as the performing time of step 202. For example: the ambiguous period is 10 ms, and whether to send the uplink signal is determined according to the control message received 10 ms before the time N.

In this embodiment of the present disclosure, the control message may include:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

The DRX MAC CE may include a conventional DRX MAC CE or a long DRX MAC CE, which is not limited herein, for example: it may also be a short DRX MAC CE.

The uplink message may also include other messages, such as: HARQ Acknowledgement (ACK)/Negative Acknowledgement (NACK), and the like.

The determining by the terminal, according to the control message which is received, whether to send the uplink signal at the current time includes:

determining by the terminal, according to the control message which is received, whether the current time is an Active Time, and not sending the SRS by the terminal in a case that the current time is not the Active Time; or in a case that the terminal is configured with a CSI masking, determining by the terminal, according to the control message which is received, whether an on duration timer is running at the current time, and not sending the CSI by the terminal in a case that the on duration timer is not running; or in a case that the terminal is not configured with the CSI masking, determining by the terminal, according to the control message which is received, whether the current time is the Active Time, and not sending the CSI by the terminal in the case that the current time is not the Active Time.

In the embodiment, whether CSI or SRS is sent at the current time is determined according to the control message received before subtracting the ambiguous period from the time N, so that it is able to avoid the inconsistent understanding of the network-side device and the terminal for whether the terminal sends the CSI or SRS, thereby realizing an accurate transmission of CSI and SRS between the network-side device and the terminal, avoiding the unnecessary blind detection of the network-side device, and improving the communication performance of the wireless communication system.

In the embodiment of the present disclosure, the inconsistent understanding of the network-side device and the terminal for the Active Time of the terminal may be avoided through steps 201 and 202, so that uplink message transmission is performed according to the result determined in step 202, thereby ensuring that the CSI, SRS, ACK, or NACK messages may be correctly transmitted between the network-side device and the terminal, and also avoiding unnecessary blind detection, saving the power consumption.

Optionally, the determining by the terminal the ambiguous period includes:

determining the ambiguous period by the terminal, according to at least one of a content carried by the PDCCH and a Channel State Information (CSI) masking configuration.

The content carried by the PDCCH may be PDCCH scheduling content, for example: UL grant or downlink scheduling, and the CSI masking configuration may be a terminal CSI masking configuration, for example: the terminal is configured with the CSI masking, or the terminal is not configured with the CSI masking.

It should be noted that, determining the ambiguous period according to at least one of the content carried by the PDCCH and the CSI masking configuration may be understood as determining the ambiguous period according to the content carried by the PDCCH or the CSI masking configuration, and may also be determining the ambiguous period according to the content carried by the PDCCH and the CSI masking configuration.

According to the embodiment of the present disclosure, since the ambiguous period is determined according to at least one of the content carried by the PDCCH and the CSI masking configuration, it is able to determine different ambiguous periods for different scenarios, thereby improving the accuracy of the ambiguous period.

Optionally, the determining the ambiguous period by the terminal according to at least one of the content carried by the PDCCH and the CSI masking configuration includes:

in a case that the terminal is not configured with the CSI masking and the content carried by the PDCCH is an uplink (UL) grant, determining by the terminal that the ambiguous period is equal to the processing time for the PDCCH; or in the case that the terminal is not configured with the CSI masking and the content carried by the PDCCH is a downlink (DL) assignment, determining by the terminal that the ambiguous period is equal to a sum of a K0, a K1 and the processing time for the MAC CE; or in a case that the terminal is configured with the CSI masking, determining by the terminal that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

The time interval between the PDCCH and a PDSCH scheduled by the PDCCH may also be referred to as the timing relationship between the PDCCH of DL assignment and the PDSCH scheduled by the PDCCH, and the time interval between the PDSCH and a HARQ feedback corresponding to the PDSCH may also be referred to as the timing relationship between the PDSCH and the HARQ ACK/ HARQ NACK feedback corresponding to the PDSCH.

In the embodiment of the present disclosure, because the terminal is not configured with the CSI masking and the content carried by the PDCCH is UL grant, the ambiguous period is determined to be equal to the processing time for the PDCCH, thereby avoiding the inconsistent understanding of the network-side device and the terminal for the Active Time of the terminal due to the processing time for the PDCCH, ensuring that the uplink messages such as CSI, SRS, ACK, NACK may be correctly transmitted between the network-side device and the terminal, and also avoiding unnecessary blind detection, saving the power consumption.

In addition, in the embodiment of the present disclosure, in a case that the terminal is not configured with the CSI masking and the content carried by the PDCCH is not a UL grant, the ambiguous period is determined to be equal to the sum of K0, K1 and the processing time for the MAC CE, that is, in this case, the ambiguous period is equal to K0+ K1+ processing time for the MAC CE, thereby avoiding the inconsistent understanding of the network-side device and the terminal for the Active Time of the terminal due to the receiving time of the PDSCH and the processing time for the MAC CE, ensuring that the uplink messages such as CSI, SRS, ACK, NACK may be correctly transmitted between the network-side device and the terminal, and also avoiding unnecessary blind detection, saving the power consumption.

In addition, in the embodiment of the present disclosure, in a case that the terminal is configured with the CSI masking, the ambiguous period is determined to be equal to the sum of K1 and the processing time for the MAC CE. That is, the terminal is configured with the CSI masking, and regardless of the content scheduled by the PDCCH, the ambiguous period is equal to K1+ processing time for the MAC CE. Similarly, it is able to avoid the inconsistent understanding of the network-side device and the terminal for the Active Time of the terminal due to the receiving time of the PDSCH and the processing time for the MAC CE, ensure that the uplink messages such as CSI, SRS, ACK, NACK may be correctly transmitted between the network-side device and the terminal, and also avoid unnecessary blind detection, save the power consumption.

Optionally, the determining by the terminal the ambiguous period includes:

determining by the terminal that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

In the embodiment of the present disclosure, the ambiguous period may be fixed to the sum of K0, K1 and the processing time for the MAC CE, that is, regardless of the content carried by the PUCCH and whether the terminal is configured with the CSI masking, the ambiguous period is always equal to K0+ K1+ processing time for the MAC CE, thereby avoiding the inconsistent understanding of the network-side device and the terminal for the Active Time of the terminal, ensuring that the uplink messages such as CSI, SRS, ACK, NACK may be correctly transmitted between the network-side device and the terminal, and also avoiding unnecessary blind detection, saving the power consumption.

Optionally, in the embodiment of the present disclosure, a value of the K0 is a maximum value of the K0 allowed by a Radio Resource Control (RRC) signaling configuration, or the value of the K0 is a fixed value which is a duration required by a Bandwidth Part (BWP) change.

Due to that the maximum K0 value allowed by RRC signaling configuration is used, thereby avoiding the inconsistent understanding of the network-side device and the terminal for the Active Time of the terminal. In addition, the K0 is the duration (e.g. 2 ms) required by the BWP change, thereby at least avoiding the inconsistent understanding of the network-side device and the terminal for the Active Time of the terminal due to the BWP change.

Optionally, in the embodiment of the present disclosure, the K1 is a maximum K1 value allowed by RRC configuration signaling configuration, or the K1 is a fixed value.

The maximum K1 value allowed by the RRC configuration signaling configuration is used, thereby avoiding the inconsistent understanding of the network-side device and the terminal for the Active Time of the terminal. The fixed value may be 1 ms, or other fixed values defined in the protocol, and since the value K1 may be a fixed value, the complexity of determining the ambiguous period may be reduced to some extent.

Optionally, in the embodiment of the present disclosure, the processing time for the MAC CE value is a fixed value.

For example: if MAC CE parsing cannot be completed within K1, the processing time for the MAC CE is a fixed value other than zero, for example: 0.5 ms.

For example: if MAC CE parsing can be completed within the K1, the processing time for the MAC CE is 0 ms.

In this embodiment, the processing time for the MAC CE is a fixed value (for example, if the MAC CE In this embodiment cannot be completed within the K1, the processing time for the MAC CE is a fixed value other than zero, and conversely, is 0 ms), thereby avoiding the inconsistent understanding of the network-side device and the terminal for the Active Time of the terminal due to the processing time for the MAC CE.

In the embodiment of the disclosure, a terminal determines an ambiguous period, wherein the ambiguous period corresponds to a processing time for a PDCCH, or the ambiguous period corresponds to a processing time for an MAC CE; and the terminal determines whether to send the uplink signal at the current time according to the control message which is received, where the difference between the receiving time of the control message and the current time is greater than or equal to the ambiguous period. Therefore, whether the uplink message is sent may be determined according to the ambiguous period, so that transmission errors between the network-side device and the terminal may be reduced, the communication performance of the wireless communication system may be improved, and unnecessary blind detection of the network-side device may be avoided.

The following three embodiments are used to illustrate the method of determining the ambiguous period in the embodiment shown in FIG. 2.

Example 1 the terminal is not configured with the CSI masking.

Figure 3:
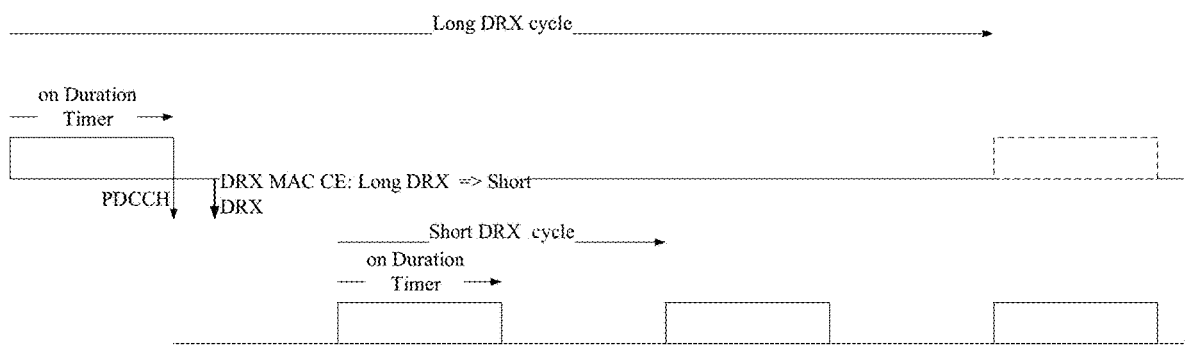
FIG. 3 is a switching diagram of a DRX cycle in an embodiment of the present disclosure.

Assuming that the terminal is currently in long DRX, as shown in FIG. 3, the PDCCH is received before the on duration timer ends, and a DRX MAC CE is scheduled to allow the terminal to switch from long DRX to short DRX.

In this case, if CSI masking is not configured:

the PDCCH content carries UL grant, so the ambiguous period is equal to the processing time for the PDCCH;

otherwise, the ambiguous periods are all set to K0+K1+ processing time for the MAC CE.

The calculation mode of each parameter value is as follows:

the K0 value can be obtained by the following methods:

according to the RRC configuration, the value of K0 is always the maximum value of K0 configured by RRC when the ambiguous period is calculated; or the value of K0 is related to whether BWP is changed, and the value of K0 is the duration of BWP change during the calculation of the ambiguous period, namely K0 calculates according to 2 ms.

The K1 value can be obtained by the following methods:

according to the RRC configuration, the value of K1 is always the maximum value of K1 configured by RRC when the ambiguous period is calculated; or the K1 value is calculated according to a fixed value of 1 ms.

The MAC CE value can be obtained by the following methods:

if the MAC CE parsing cannot be completed within K1, the MAC CE is fixedly calculated according to 0.5 ms;

if MAC CE parsing cannot be completed within K1, the MAC CE is fixedly calculated according to 0 ms.

Figure 4:
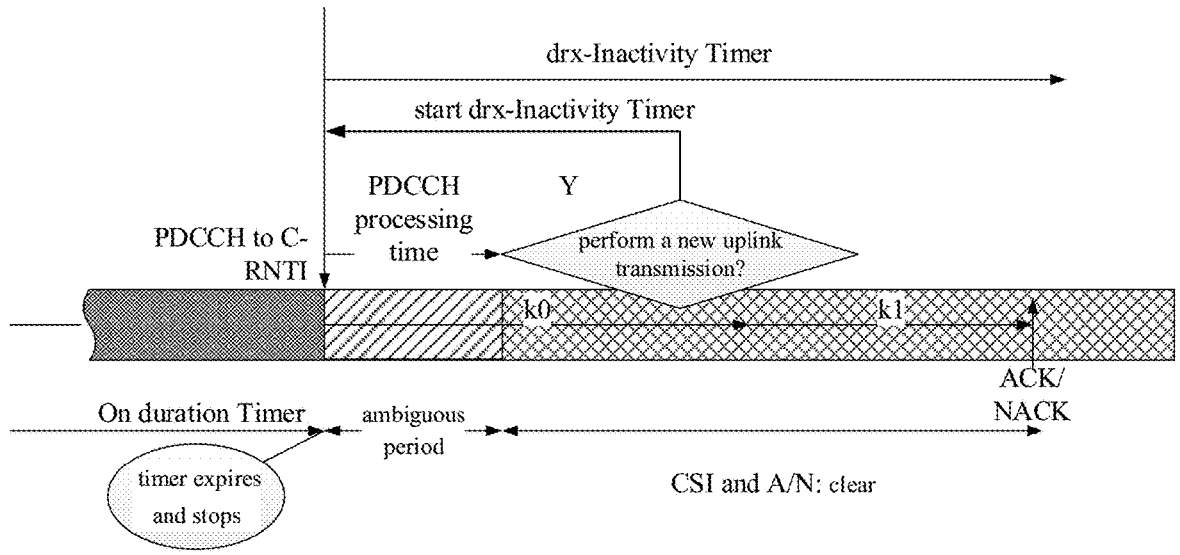
FIG. 4 is a schematic view of an ambiguous period in an embodiment of the present disclosure.

Specifically, in the case that the PDCCH carries an UL grant, the ambiguous period diagram is as shown in FIG. 4, the PDCCH transmits a Cell Radio Network Temporary identity (C-RNTI), the on duration timer is stopped by a timer expiry, wherein the ambiguous period is equal to the processing time for the PDCCH (PDCCH processing time), after the ambiguous period expires, it is determined whether to perform a New uplink transmission, if so, a Start drx-Inactivity Timer (Start_Inactivity) is started, so that CSI and a/N are clear (CSI and a/N: no ambiguity) in a time interval of K1 and a part of K0 (minus the ambiguous period), where A represents ACK and N represents NACK.

Figure 5:
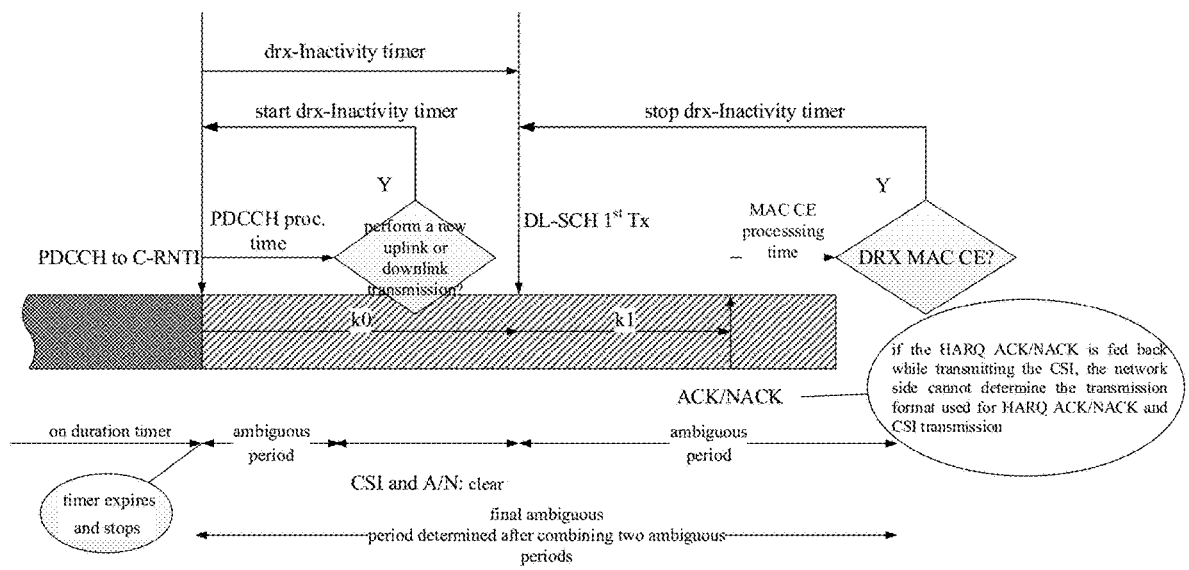
FIG. 5 is another schematic view of an ambiguous period in an embodiment of the present disclosure.

FIG. 5 shows a schematic view of the ambiguous period in other cases, and the ambiguous period is divided into two segments: one segment is the processing time for the PDCCH, the other is the time after the drx-inactivity timer times out until the MAC CE is parsed, but for simplicity, the PDCCH may be unified for a period of time, the starting point thereof is the PDCCH receiving time, and the end point thereof is the time when the MAC CE is successfully parsed. In FIG. 5, during the drx-Inactivity Timer operation period, the downlink shared channel transmission (DL-SCH 1st Tx) is performed, and the drx-Inactivity Timer (Stop drx-Inactivity Timer) is stopped. It should be noted that, in the second segment of the ambiguous period, if the HARQ ACK/NACK is fed back while transmitting the CSI, the network side cannot determine the transmission format used for HARQ ACK/NACK and CSI transmission.

Example 2 the terminal is configured with the CSI masking.

Figure 6:
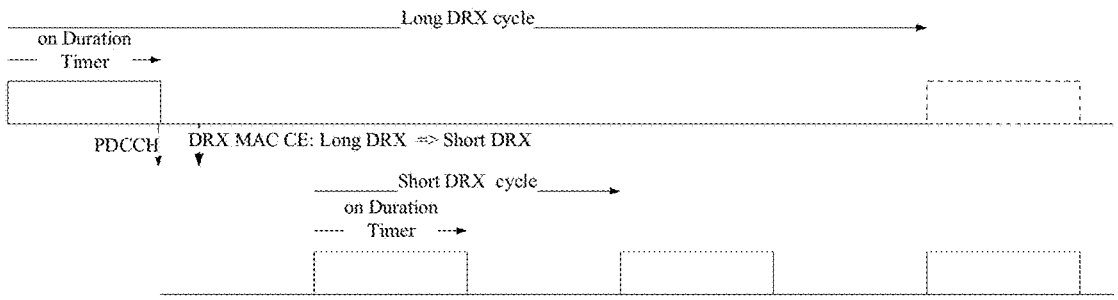
FIG. 6 is a schematic switching diagram of a DRX cycle in an embodiment of the present disclosure.

Assuming that the terminal is currently in long DRX, as shown in FIG. 6, the PDCCH is received before the on duration Timer ends, and the DRX MAC CE is scheduled to switch the terminal from long DRX to short DRX.

In this case, if CSI masking is configured:

regardless of the content scheduled by the PDCCH, the ambiguous period T3 is equal to K1+ processing time for the MAC CE.

The calculation mode of each parameter value is as follows:

the K1 value can be taken as follows:

according to RRC configuration, the value of K1 is always the maximum value of K1 configured by RRC when the ambiguous period is calculated; or the K1 value is calculated according to a fixed value of 1 ms;

the MAC CE value can be obtained by the following methods:

if the MAC CE parsing cannot be completed within the K1, the MAC CE is fixedly calculated according to 0.5 ms;

if MAC CE parsing cannot be completed within K1, the MAC CE is fixedly calculated according to 0 ms.

Figure 7:
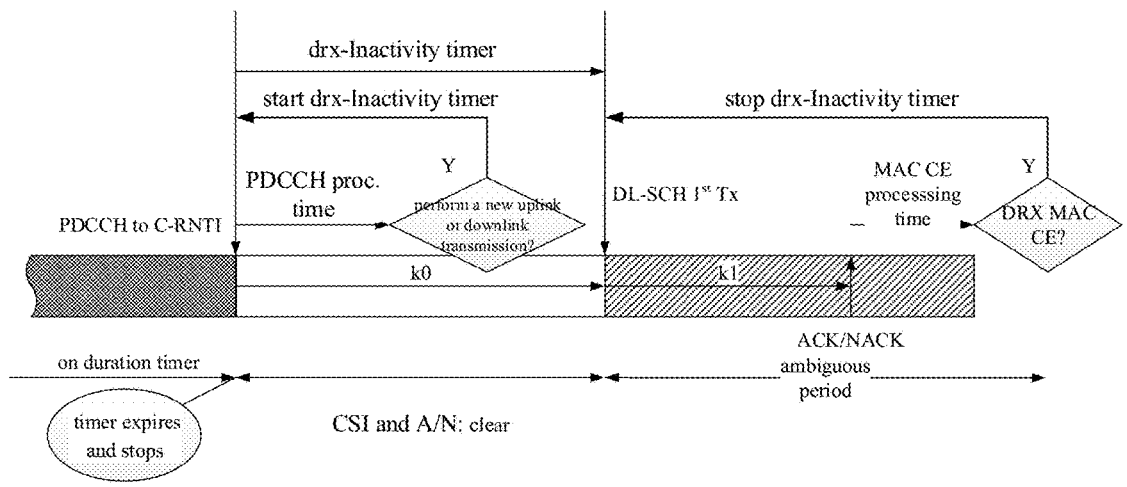
FIG. 7 is another schematic view of an ambiguous period in an embodiment of the present disclosure.

Specifically, as shown in FIG. 7, because CSI masking is configured, the terminal does not report the CSI during the on duration, and there is no inconsistent understanding between the base station and the terminal for whether CSI is reported, and it is only needed to consider whether ACK/NACK is ambiguous, where the starting point of the ambiguous period is the PDSCH receiving time and the ending point is the time when the MAC CE is successfully parsed.

Example 3 fixed length of ambiguous period

Figure 8:
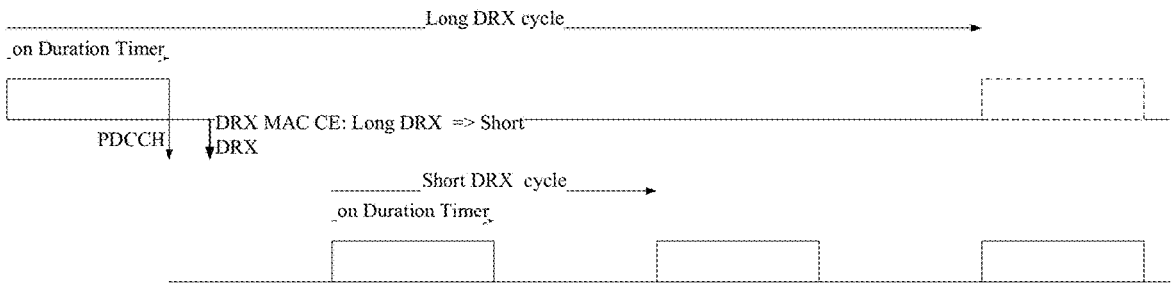
FIG. 8 is another schematic switching diagram of a DRX cycle in an embodiment of the present disclosure.

As shown in FIG. 8, assuming that the terminal is currently in long DRX, the PDCCH is received before the on duration Timer ends, and a DRX MAC CE is scheduled to switch the terminal from long DRX to short DRX.

In this case, the ambiguous periods are all set to K0+ K1+ processing time for the MAC CE.

The calculation mode of each parameter value is as follows:

the K0 value can be taken as follows:

according to RRC configuration, the value of K0 is always the maximum value of K0 configured by RRC when the ambiguous period is calculated; or the value of K0 is related to whether BWP changes, and the value of K0 takes the duration of BWP change when calculating the ambiguous period, namely K0 value is calculated according to 2 ms;

the K1 value can be taken as follows:

according to RRC configuration, the value of K1 is always the maximum value of K1 configured by RRC when the ambiguous period is calculated; or the K1 value is calculated according to a fixed value of 1 ms;

the MAC CE value can be obtained by the following methods:

if the MAC CE parsing cannot be completed within the K1, the MAC CE is fixedly calculated according to 0.5 ms;

if MAC CE parsing cannot be completed within K1, MAC CE is fixedly calculated according to 0 ms.

Figure 9:
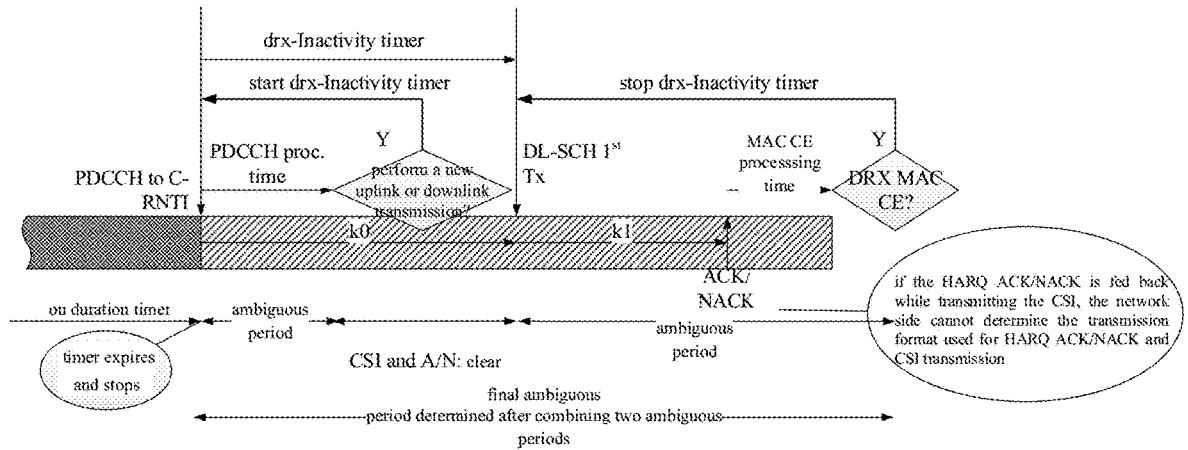
FIG. 9 is another schematic view of an ambiguous period in an embodiment of the present disclosure.

Specifically, a schematic view of the ambiguous period is shown in FIG. 9, where the ambiguous period is divided into two segments: one segment is the processing time for the PDCCH, the other segment is the time after the drx-inactivity timer times out until the MAC CE is parsed, but for simplicity, the PDCCH can be unified for a period of time, the starting point is the PDCCH receiving time, and the end point is the time when the MAC CE is successfully parsed.

Figure 10:
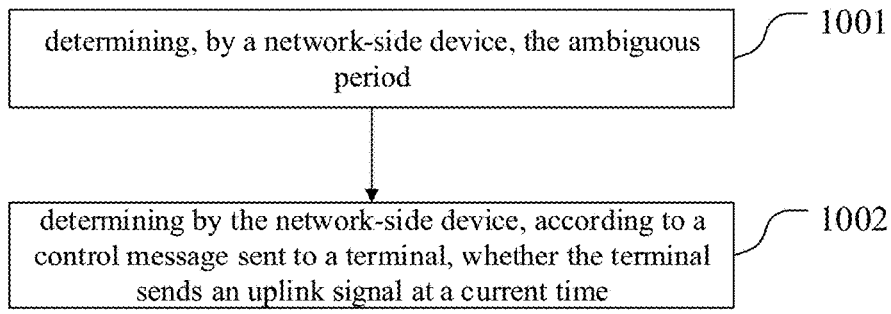
FIG. 10 is another flowchart of a method of determining an ambiguous period in an embodiment of the present disclosure.

Referring to FIG. 10 which is another flowchart of a method of determining an ambiguous period in an embodiment of the present disclosure, as shown in FIG. 10, the method includes the following steps:

1001: determining, by a network-side device, the ambiguous period, where the ambiguous period corresponds to a processing time for a Physical Downlink Control Channel (PDCCH), or the ambiguous period corresponds to a processing time for a Media Access Control Control Element (MAC CE); and 1002: determining by the network-side device, according to a control message sent to a terminal, whether the terminal sends an uplink signal at a current time, where a difference between a receiving time of the control message and the current time is greater than or equal to the ambiguous period.

Optionally, the determining by the network-side device the ambiguous period includes:

determining the ambiguous period by the network-side device, according to at least one of a content carried by the PDCCH and a Channel State Information (CSI) masking configuration.

Optionally, the determining the ambiguous period by the network-side device according to at least one of the content carried by the PDCCH and the CSI masking configuration includes:

in a case that the terminal is not configured with the CSI masking and the content carried by the PDCCH is an uplink (UL) grant, determining by the network-side device that the ambiguous period is equal to the processing time for the PDCCH; or in the case that the terminal is not configured with the CSI masking and the content carried by the PDCCH is a downlink (DL) assignment, determining by the network-side device that the ambiguous period is equal to a sum of a K0, a K1 and the processing time for the MAC CE; or in a case that the terminal is configured with the CSI masking, determining by the network-side device that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining by the network-side device the ambiguous period includes:

determining by the network-side device that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining by the network-side device, according to the control message sent to the terminal, whether the terminal sends the uplink signal at the current time includes:

determining by the network-side device, according to the control message sent to the terminal, whether the current time is an Active Time, and determining, by the network-side device, that the terminal does not send the SRS, in a case that the current time is not the Active Time; or in a case that the terminal is configured with a CSI masking, determining by the network-side device, according to the control message sent to the terminal, whether an on duration timer is running at the current time, and determining, by the network-side device, that the terminal does not send the CSI, in a case that the on duration timer is not running; or in a case that the terminal is not configured with the CSI masking, determining by the network-side device, according to the control message sent to the terminal, whether the current time is the Active Time, and determining, by the network-side device, that the terminal does not send the CSI, in the case that the current time is not the Active Time.

It should be noted that, the above embodiment is used as an the embodiment of the network-side device corresponding to the embodiment shown in FIG. 2, and specific embodiment thereof may refer to relevant descriptions of the embodiment shown in FIG. 2, so in order to avoid repeated descriptions, this embodiment is not described again, and the same beneficial effects may also be achieved.

Figure 11:
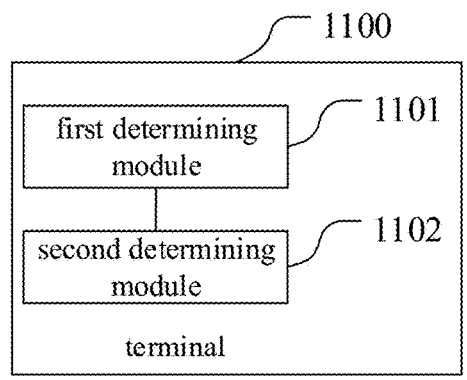
FIG. 11 is a structural diagram of a terminal in an embodiment of the present disclosure.

FIG. 11 is a structural diagram of a terminal in an embodiment of the present disclosure, and as shown in FIG. 11, a terminal 1100 includes:

a first determining module 1101, configured to determine an ambiguous period, where the ambiguous period corresponds to a processing time for a Physical Downlink Control Channel (PDCCH), or the ambiguous period corresponds to a processing time for a Media Access Control Control Element (MAC CE); and a second determining module 1102, configured to determine, according to a control message which is received, whether to send an uplink signal at a current time, where a difference between a receiving time of the control message and the current time is greater than or equal to the ambiguous period;

Optionally, the first determining module 1101 is configured to determine the ambiguous period, according to at least one of a content carried by the PDCCH and a Channel State Information (CSI) masking configuration.

Optionally, the first determining module 1101 is configured to:

in a case that the terminal is not configured with the CSI masking and the content carried by the PDCCH is an uplink (UL) grant, determine that the ambiguous period is equal to the processing time for the PDCCH; or in the case that the terminal is not configured with the CSI masking and the content carried by the PDCCH is a downlink (DL) assignment, determine that the ambiguous period is equal to a sum of a K0, a K1 and the processing time for the MAC CE; or in a case that the terminal is configured with the CSI masking, determine that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the first determining module 1101 is configured to determine that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the second determining module 1102 is configured to determine, according to the control message which is received, whether the current time is an Active Time, and not send the SRS in a case that the current time is not the Active Time; or in a case that the terminal is configured with a CSI masking, determine, according to the control message which is received, whether an on duration timer is running at the current time, and not send the CSI in a case that the on duration timer is not running; or in a case that the terminal is not configured with the CSI masking, determine, according to the control message which is received, whether the current time is the Active Time, and not send the CSI in the case that the current time is not the Active Time.

It should be noted that, in this embodiment, the terminal 1100 may be any terminal in the method embodiment in the embodiment of the present disclosure, and any embodiment of the terminal in the method embodiment in the embodiment of the present disclosure may be implemented by the terminal 1100 in this embodiment to achieve the same beneficial effect, and details thereof are not repeated here.

Figure 12:
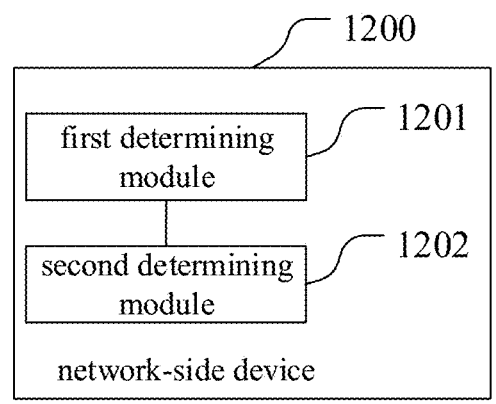
FIG. 12 is a structural diagram of a network-side device in an embodiment of the present disclosure.

FIG. 12 is a structural diagram of a network-side device in an embodiment of the present disclosure, and as shown in FIG. 12, a network-side device 1200 includes:

a first determining module 1201, configured to determine an ambiguous period, where the ambiguous period corresponds to a processing time for a Physical Downlink Control Channel (PDCCH), or the ambiguous period corresponds to a processing time for a Media Access Control Control Element (MAC CE); and a second determining module 1202, configured to determine, according to a control message sent to a terminal, whether the terminal sends an uplink signal at a current time, where a difference between a receiving time of the control message and the current time is greater than or equal to the ambiguous period.

Optionally, the first determining module 1201 is configured to determine the ambiguous period, according to at least one of a content carried by the PDCCH and a Channel State Information (CSI) masking configuration.

Optionally, the first determining module 1201 is configured to:

in a case that the terminal is not configured with the CSI masking and the content carried by the PDCCH is an uplink (UL) grant, determine that the ambiguous period is equal to the processing time for the PDCCH; or in the case that the terminal is not configured with the CSI masking and the content carried by the PDCCH is a downlink (DL) assignment, determine that the ambiguous period is equal to a sum of a K0, a K1 and the processing time for the MAC CE; or in a case that the terminal is configured with the CSI masking, determine that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the first determining module 1201 is configured to determine that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the second determining module 1202 is configured to:

determine, according to the control message sent to the terminal, whether the current time is an Active Time, and determine that the terminal does not send the SRS, in a case that the current time is not the Active Time; or in a case that the terminal is configured with a CSI masking, determine, according to the control message sent to the terminal, whether an on duration timer is running at the current time, and determine that the terminal does not send the CSI, in a case that the on duration timer is not running; or in a case that the terminal is not configured with the CSI masking, determine, according to the control message sent to the terminal, whether the current time is the Active Time, and determine that the terminal does not send the CSI, in the case that the current time is not the Active Time.

It should be noted that, in this embodiment, the network-side device 1200 may be any network-side device in the method embodiment in the embodiment of the present disclosure, and any embodiment of the network-side device in the method embodiment in the embodiment of the present disclosure may be implemented by the network-side device 1200 in this embodiment to achieve the same beneficial effect, and details thereof are not repeated here.

Figure 13:
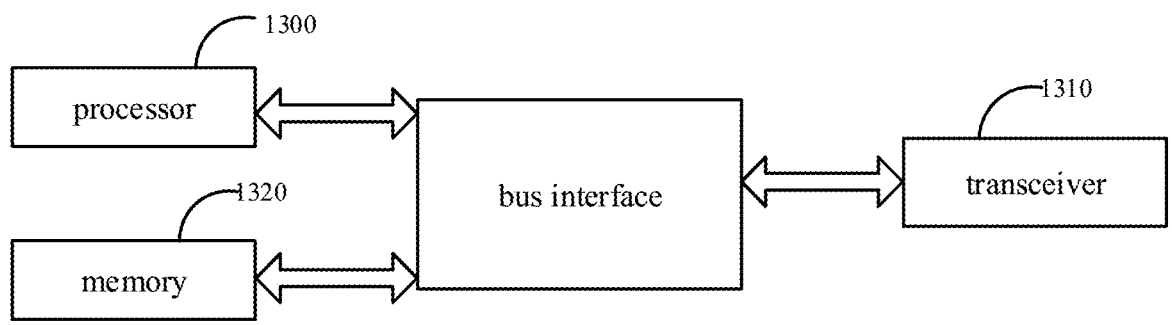
FIG. 13 is a another structural diagram of a terminal in an embodiment of the present disclosure.
Figure 14:
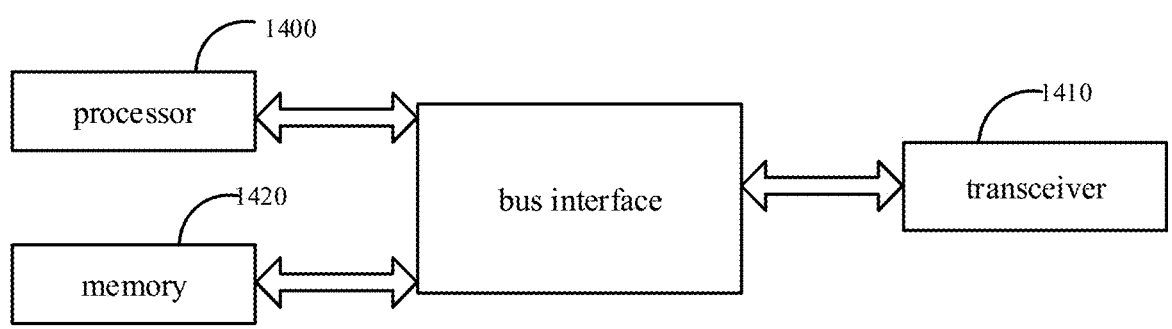
FIG. 14 is another structural diagram of a network-side device in an embodiment of the present disclosure.

FIG. 13 is a another structural diagram of a terminal in an embodiment of the present disclosure, and as shown in FIG. 13, the terminal includes: a transceiver 1310, a memory 1320, a processor 1300, and a program stored in the memory 1320 and executable on the processor 1200, the processor 1300 is configured to read the program in the memory 1320 to perform:

determine an ambiguous period, where the ambiguous period corresponds to a processing time for a Physical Downlink Control Channel (PDCCH), or the ambiguous period corresponds to a processing time for a Media Access Control Control Element (MAC CE); and determine, according to a control message which is received, whether to send an uplink signal at a current time, where a difference between a receiving time of the control message and the current time is greater than or equal to the ambiguous period;

or, the transceiver 1310 is configured to:

determine an ambiguous period, where the ambiguous period corresponds to a processing time for a PDCCH, or the ambiguous period corresponds to a processing time for an MAC CE; and determine, according to a control message which is received, whether to send an uplink signal at a current time, where a difference between a receiving time of the control message and the current time is greater than or equal to the ambiguous period.

The transceiver 1310 is configured to to receive and transmit data under the control of the processor 1300.

In FIG. 13, the bus architecture may include any number of interconnected buses and bridges, with various circuits representing one or more processors, in particular processor 1300, and memory, in particular memory 1320. The bus architecture may also link together various other circuits such as peripherals, voltage regulators, power management circuits, and the like, which are well known in the art, and therefore, will not be described any further herein. The bus interface provides an interface. The transceiver 1310 can be a number of elements including a transmitter and receiver that provide a means for communicating with various other apparatus over a transmission medium.

The processor 1300 is responsible for managing the bus architecture and general processing, and the memory 1320 may store data used by the processor 1300 in performing operations.

It should be understood that the memory 1320 is not limited to being implemented on a terminal, and the memory 1320 and the processor 1300 may be separated and located in different geographical locations.

Optionally, the determining the ambiguous period includes:

determining the ambiguous period, according to at least one of a content carried by the PDCCH and a Channel State Information (CSI) masking configuration.

Optionally, the determining the ambiguous period according to at least one of the content carried by the PDCCH and the CSI masking configuration includes:

in a case that the terminal is not configured with the CSI masking and the content carried by the PDCCH is an uplink (UL) grant, determining that the ambiguous period is equal to the processing time for the PDCCH; or in the case that the terminal is not configured with the CSI masking and the content carried by the PDCCH is a downlink (DL) assignment, determining that the ambiguous period is equal to a sum of a K0, a K1 and the processing time for the MAC CE; or in a case that the terminal is configured with the CSI masking, determining that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining the ambiguous period includes:

determining that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining, according to the control message which is received, whether to send the uplink signal at the current time includes:

determining, according to the control message which is received, whether the current time is an Active Time, and not sending the SRS in a case that the current time is not the Active Time; or in a case that the terminal is configured with a CSI masking, determining, according to the control message which is received, whether an on duration timer is running at the current time, and not sending the CSI in a case that the on duration timer is not running; or in a case that the terminal is not configured with the CSI masking, determining, according to the control message which is received, whether the current time is the Active Time, and not sending the CSI in the case that the current time is not the Active Time.

It should be noted that, in this embodiment, the terminal may be any terminal in the method embodiment in the embodiment of the present disclosure, and any embodiment of the terminal in the method embodiment in the embodiment of the present disclosure may be implemented by the terminal in this embodiment to achieve the same beneficial effect, and details thereof are not repeated here.

FIG. 7 is another schematic view of an ambiguous period in an embodiment of the present disclosure, and as shown in FIG. 7, the network-side device includes: a transceiver 710, a memory 720, a processor 700, and a program stored in the memory 720 and executable on the processor, the processor 1400 is configured to read the program in the memory 1420 to perform:

determining an ambiguous period, where the ambiguous period corresponds to a processing time for a Physical Downlink Control Channel (PDCCH), or the ambiguous period corresponds to a processing time for a Media Access Control Control Element (MAC CE); and determining, according to a control message sent to a terminal, whether the terminal sends an uplink signal at a current time, where a difference between a receiving time of the control message and the current time is greater than or equal to the ambiguous period;

or, the transceiver 1410 is configured to:

determine an ambiguous period, where the ambiguous period corresponds to a processing time for a Physical Downlink Control Channel (PDCCH), or the ambiguous period corresponds to a processing time for a Media Access Control Control Element (MAC CE); and determine, according to a control message sent to a terminal, whether the terminal sends an uplink signal at a current time, where a difference between a receiving time of the control message and the current time is greater than or equal to the ambiguous period.

The transceiver 710 is configured to receive and transmit data under the control of the processor 700.

In FIG. 7, the bus architecture may include any number of interconnected buses and bridges, with various circuits being linked together, in particular, one or more processors, represented by processor 700, and memory, represented by memory 720. The bus architecture may also link together various other circuits such as peripherals, voltage regulators, power management circuits, and the like, which are well known in the art, and therefore, will not be described any further herein. The bus interface provides an interface. The transceiver 710 may be a plurality of elements including a transmitter and a receiver that provide a means for communicating with various other apparatus over a transmission medium.

The processor 700 is responsible for managing the bus architecture and general processing, and the memory 720 may store data used by the processor 700 in performing operations.

It should be noted that the memory 720 is not limited to be on the network-side device, and the memory 720 and the processor 700 may be separated and located in different geographical locations.

Optionally, the determining the ambiguous period includes:

determining the ambiguous period, according to at least one of a content carried by the PDCCH and a Channel State Information (CSI) masking configuration.

Optionally, the determining the ambiguous period according to at least one of the content carried by the PDCCH and the CSI masking configuration includes:

in a case that the terminal is not configured with the CSI masking and the content carried by the PDCCH is an uplink (UL) grant, determining that the ambiguous period is equal to the processing time for the PDCCH; or in the case that the terminal is not configured with the CSI masking and the content carried by the PDCCH is a downlink (DL) assignment, determining that the ambiguous period is equal to a sum of a K0, a K1 and the processing time for the MAC CE; or in a case that the terminal is configured with the CSI masking, determining that the ambiguous period is equal to a sum of the K1 and the processing time for the MAC CE;

where the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

Optionally, the determining the ambiguous period includes:

determining that the ambiguous period is equal to a sum of K0, K1 and the processing time for the MAC CE;

where the K0 is a time interval between the PDCCH and a PDSCH scheduled by the PDCCH, and the K1 is a time interval between the PDSCH and a HARQ feedback corresponding to the PDSCH.

Optionally, a value of the K0 is a maximum value of the K0 allowed by a Radio Resource Control (RRC) signaling configuration, or the value of the K0 is a fixed value which is a duration required by a Bandwidth Part (BWP) change;

where a value of the K1 is a maximum value of the K1 allowed by the RRC signaling configuration, or the K1 is a fixed value;

a value of the processing time for the MAC CE is a fixed value.

Optionally, the control message includes:

at least one of a downlink scheduling signaling, an uplink scheduling signaling, a scheduling request and a Discontinuous Reception (DRX) MAC CE;

the uplink signal includes at least one of CSI and a Sounding Reference Signal (SRS).

Optionally, the determining, according to the control message sent to the terminal, whether the terminal sends the uplink signal at the current time includes:

determining, according to the control message sent to the terminal, whether the current time is an Active Time, and determining that the terminal does not send the SRS, in a case that the current time is not the Active Time; or in a case that the terminal is configured with a CSI masking, determining, according to the control message sent to the terminal, whether an on duration timer is running at the current time, and determining that the terminal does not send the CSI, in a case that the on duration timer is not running; or in a case that the terminal is not configured with the CSI masking, determining, according to the control message sent to the terminal, whether the current time is the Active Time, and determining that the terminal does not send the CSI, in the case that the current time is not the Active Time.

It should be noted that, in this embodiment, the network-side device may be any network-side device in the method embodiment in the embodiment of the present disclosure, and any embodiment of the network-side device in the method embodiment in the embodiment of the present disclosure may be implemented by the network-side device in this embodiment to achieve the same beneficial effect, and details thereof are not repeated here.

A computer-readable storage medium is further in an embodiment of the present disclosure, where a computer program is stored in the computer-readable storage medium, where the program is executed by a processor to perform the method of determining the ambiguous period at the terminal side, or the program is executed by the processor to perform the method of determining the ambiguous period at the network-side device side.

In the several embodiments provided in the present application, it should be understood that the disclosed method and apparatus may be implemented in other manners. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each unit may be separately and physically included, or two or more units may be integrated into one unit. The integrated unit may be implemented in the form of hardware, or in the form of hardware plus a software functional unit.

The integrated unit implemented in the form of a software functional unit may be stored in a computer-readable storage medium. The software functional unit is stored in a storage medium and includes several instructions to enable a computer device (which may be a personal computer, a server, or a network device, etc.) to execute some steps of the method of processing the information data block according to various embodiments of the present disclosure. And the aforementioned storage medium includes: a U-disk, a portable hard disk, a Read-Only Memory (ROM), a Random Access Memory (RAM), a magnetic disk or an optical disk, and other media capable of storing program codes.

While the foregoing is directed to some embodiments of the present disclosure, it will be appreciated by those skilled in the art that various changes and modifications may be made therein without departing from the principles of the disclosure, and such changes and modifications be covered by the scope of the disclosure.

What is claimed is:

1. A method of determining an ambiguous period, comprising:

determining, by a terminal, the ambiguous period, wherein the ambiguous period corresponds to a processing time for a Physical Downlink Control Channel (PDCCH), or the ambiguous period corresponds to a processing time for a Media Access Control Control Element (MAC CE); and determining by the terminal, according to a control message which is received, whether to send an uplink signal at a current time, wherein a difference between a receiving time of the control message and the current time is greater than or equal to the ambiguous period;

wherein the determining by the terminal the ambiguous period comprises:

determining the ambiguous period by the terminal, according to a content carried by the PDCCH and a Channel State Information (CSI) masking configuration.

2. The method according to claim 1, wherein the determining the ambiguous period by the terminal according to the content carried by the PDCCH and the CSI masking configuration comprises:

in a case that the terminal is not configured with the CSI masking and the content carried by the PDCCH is an uplink (UL) grant, determining by the terminal that the ambiguous period is equal to the processing time for the PDCCH; or in the case that the terminal is not configured with the CSI masking and the content carried by the PDCCH is a downlink (DL) assignment, determining by the terminal that the ambiguous period is equal to a sum of a K0, a K1 and the processing time for the MAC CE; or in a case that the terminal is configured with the CSI masking, determining by the terminal that the ambiguous period is equal to a sum of the K1 and the processing time for the MAC CE;

wherein the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

3. The method according to claim 2, wherein a value of the K0 is a maximum value of the K0 allowed by a Radio Resource Control (RRC) signaling configuration, or the value of the K0 is a fixed value which is a duration required by a Bandwidth Part (BWP) change;

wherein a value of the K1 is a maximum value of the K1 allowed by the RRC signaling configuration, or the K1 is a fixed value;

a value of the processing time for the MAC CE is a fixed value.

4. The method according to claim 1, wherein the control message comprises:

at least one of a downlink scheduling signaling, an uplink scheduling signaling, a scheduling request and a Discontinuous Reception (DRX) MAC CE;

the uplink signal comprises at least one of CSI and a Sounding Reference Signal (SRS);

wherein the determining by the terminal, according to the control message which is received, whether to send the uplink signal at the current time comprises:

determining by the terminal, according to the control message which is received, whether the current time is an Active Time, and not sending the SRS by the terminal in a case that the current time is not the Active Time; or in a case that the terminal is configured with a CSI masking, determining by the terminal, according to the control message which is received, whether an on duration timer is running at the current time, and not sending the CSI by the terminal in a case that the on duration timer is not running; or in a case that the terminal is not configured with the CSI masking, determining by the terminal, according to the control message which is received, whether the current time is the Active Time, and not sending the CSI by the terminal in the case that the current time is not the Active Time.

5. A method of determining an ambiguous period, comprising:

determining, by a network-side device, the ambiguous period, wherein the ambiguous period corresponds to a processing time for a Physical Downlink Control Channel (PDCCH), or the ambiguous period corresponds to a processing time for a Media Access Control Control Element (MAC CE); and determining by the network-side device, according to a control message sent to a terminal, whether the terminal sends an uplink signal at a current time, wherein a difference between a receiving time of the control message and the current time is greater than or equal to the ambiguous period;

wherein the determining by the network-side device the ambiguous period comprises:

determining the ambiguous period by the network-side device, according to a content carried by the PDCCH and a Channel State Information (CSI) masking configuration.

6. The method according to claim 5, wherein the determining the ambiguous period by the network-side device according to the content carried by the PDCCH and the CSI masking configuration comprises:

in a case that the terminal is not configured with the CSI masking and the content carried by the PDCCH is an uplink (UL) grant, determining by the network-side device that the ambiguous period is equal to the processing time for the PDCCH; or in the case that the terminal is not configured with the CSI masking and the content carried by the PDCCH is a downlink (DL) assignment, determining by the network-side device that the ambiguous period is equal to a sum of a K0, a K1 and the processing time for the MAC CE; or in a case that the terminal is configured with the CSI masking, determining by the network-side device that the ambiguous period is equal to a sum of the K1 and the processing time for the MAC CE;

wherein the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

7. The method according to claim 6, wherein a value of the K0 is a maximum value of the K0 allowed by a Radio Resource Control (RRC) signaling configuration, or the value of the K0 is a fixed value which is a duration required by a Bandwidth Part (BWP) change;

wherein a value of the K1 is a maximum value of the K1 allowed by the RRC signaling configuration, or the K1 is a fixed value;

a value of the processing time for the MAC CE is a fixed value.

8. The method according to claim 5, wherein the control message comprises:

at least one of a downlink scheduling signaling, an uplink scheduling signaling, a scheduling request and a Discontinuous Reception (DRX) MAC CE;

the uplink signal comprises at least one of CSI and a Sounding Reference Signal (SRS).

9. The method according to claim 8, wherein the determining by the network-side device, according to the control message sent to the terminal, whether the terminal sends the uplink signal at the current time comprises:

determining by the network-side device, according to the control message sent to the terminal, whether the current time is an Active Time, and determining, by the network-side device, that the terminal does not send the SRS, in a case that the current time is not the Active Time; or in a case that the terminal is configured with a CSI masking, determining by the network-side device, according to the control message sent to the terminal, whether an on duration timer is running at the current time, and determining, by the network-side device, that the terminal does not send the CSI, in a case that the on duration timer is not running; or in a case that the terminal is not configured with the CSI masking, determining by the network-side device, according to the control message sent to the terminal, whether the current time is the Active Time, and determining, by the network-side device, that the terminal does not send the CSI, in the case that the current time is not the Active Time.

10. A terminal, comprising: a transceiver, a memory, a processor and a program stored in the memory and executable on the processor, wherein the processor is configured to read the program in the memory to perform:

determining an ambiguous period, wherein the ambiguous period corresponds to a processing time for a Physical Downlink Control Channel (PDCCH), or the ambiguous period corresponds to a processing time for a Media Access Control Control Element (MAC CE); and determining, according to a control message which is received, whether to send an uplink signal at a current time, wherein a difference between a receiving time of the control message and the current time is greater than or equal to the ambiguous period;

or, the transceiver is controlled by the processor to perform:

determining an ambiguous period, wherein the ambiguous period corresponds to a processing time for a PDCCH, or the ambiguous period corresponds to a processing time for an MAC CE; and determining, according to a control message which is received, whether to send an uplink signal at a current time, wherein a difference between a receiving time of the control message and the current time is greater than or equal to the ambiguous period;

wherein the determining the ambiguous period comprises:

determining the ambiguous period, according to a content carried by the PDCCH and a Channel State Information (CSI) masking configuration.

11. The terminal according to claim 10, wherein the determining the ambiguous period according to the content carried by the PDCCH and the CSI masking configuration comprises:

in a case that the terminal is not configured with the CSI masking and the content carried by the PDCCH is an uplink (UL) grant, determining that the ambiguous period is equal to the processing time for the PDCCH; or in the case that the terminal is not configured with the CSI masking and the content carried by the PDCCH is a downlink (DL) assignment, determining that the ambiguous period is equal to a sum of a K0, a K1 and the processing time for the MAC CE; or in a case that the terminal is configured with the CSI masking, determining that the ambiguous period is equal to a sum of the K1 and the processing time for the MAC CE;

wherein the K0 is a time interval between the PDCCH and a Physical Downlink Shared Channel (PDSCH) scheduled by the PDCCH, and the K1 is a time interval between the PDSCH and a Hybrid Automatic Repeat reQuest (HARQ) feedback corresponding to the PDSCH.

12. The terminal according to claim 11, wherein a value of the K0 is a maximum value of the K0 allowed by a Radio Resource Control (RRC) signaling configuration, or the value of the K0 is a fixed value which is a duration required by a Bandwidth Part (BWP) change;

wherein a value of the K1 is a maximum value of the K1 allowed by the RRC signaling configuration, or the K1 is a fixed value;

a value of the processing time for the MAC CE is a fixed value.

13. The terminal according to claim 10, wherein the control message comprises:

at least one of a downlink scheduling signaling, an uplink scheduling signaling, a scheduling request and a Discontinuous Reception (DRX) MAC CE;

the uplink signal comprises at least one of CSI and a Sounding Reference Signal (SRS);

wherein the determining, according to the control message which is received, whether to send the uplink signal at the current time comprises:

determining, according to the control message which is received, whether the current time is an Active Time, and not sending the SRS in a case that the current time is not the Active Time; or in a case that the terminal is configured with a CSI masking, determining, according to the control message which is received, whether an on duration timer is running at the current time, and not sending the CSI in a case that the on duration timer is not running; or in a case that the terminal is not configured with the CSI masking, determining, according to the control message which is received, whether the current time is the Active Time, and not sending the CSI in the case that the current time is not the Active Time.

14. A network-side device, comprising: a transceiver, a memory, a processor and a program stored in the memory and executable on the processor, wherein the processor is configured to read the program in the memory to perform the method of determining an ambiguous period according to claim 5.

* * * * *